United States Patent [19]
Shiga

[11] 3,782,043
[45] Jan. 1, 1974

[54] FEED MECHANISM FOR MACHINE TOOL

[75] Inventor: Tokio Shiga, Okazaki, Japan

[73] Assignee: Toyoda Kodi Kabushiki Kaisha, Aichi-ken, Japan

[22] Filed: Nov. 1, 1971

[21] Appl. No.: 194,306

[30] Foreign Application Priority Data
Aug. 11, 1971 Japan.............................. 46/60820

[52] U.S. Cl.............................. 51/165.78, 192/139
[51] Int. Cl............................................ B24b 49/00
[58] Field of Search..................... 51/165 R, 165.77, 51/165.78, 165.79; 192/139

[56] References Cited
UNITED STATES PATENTS
| | | | |
|---|---|---|---|
| 3,683,558 | 8/1972 | Oishi.............................. | 51/165.78 |
| 1,085,863 | 2/1914 | Hess............................... | 51/165.77 |
| 1,977,334 | 10/1934 | Berejkoff.......................... | 192/139 |

FOREIGN PATENTS OR APPLICATIONS
| | | | |
|---|---|---|---|
| 831,595 | 3/1960 | Great Britain.................. | 57/165.77 |

*Primary Examiner*—Harold D. Whitehead
*Attorney*—Oblon, Fisher & Spivak

[57] ABSTRACT

In a feed mechanism of a grinding machine for feeding a tool thereof, an annular member is adjustably mounted on the outer periphery portion of a feed wheel and a clamping member is provided on the feed wheel for locking the adjustable annular member thereto. A first stop member is secured on the annular member being movable in a circular path with the feed wheel when locked thereto and a second stop member is provided being reciprocatably movable into and out of the circular path of the first stop. Rotary movement of the feed wheel is transmitted by suitable transmission means to the second stop for advancing the same into the circular path so that the first stop may engage the second stop at a predetermined position of advancement of a tool support being effected by turning the feed wheel through a predetermined number of revolutions.

6 Claims, 4 Drawing Figures

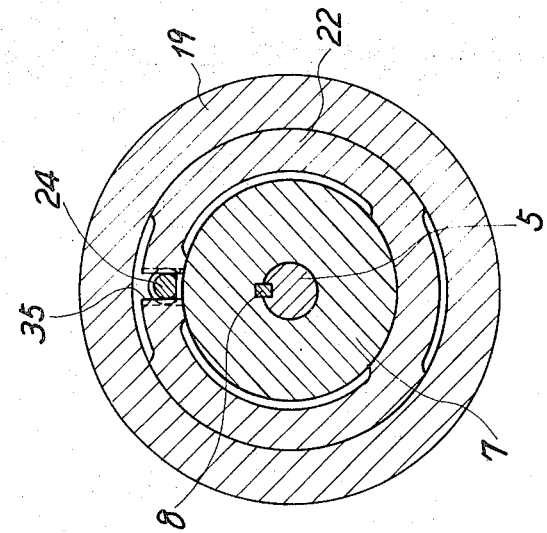
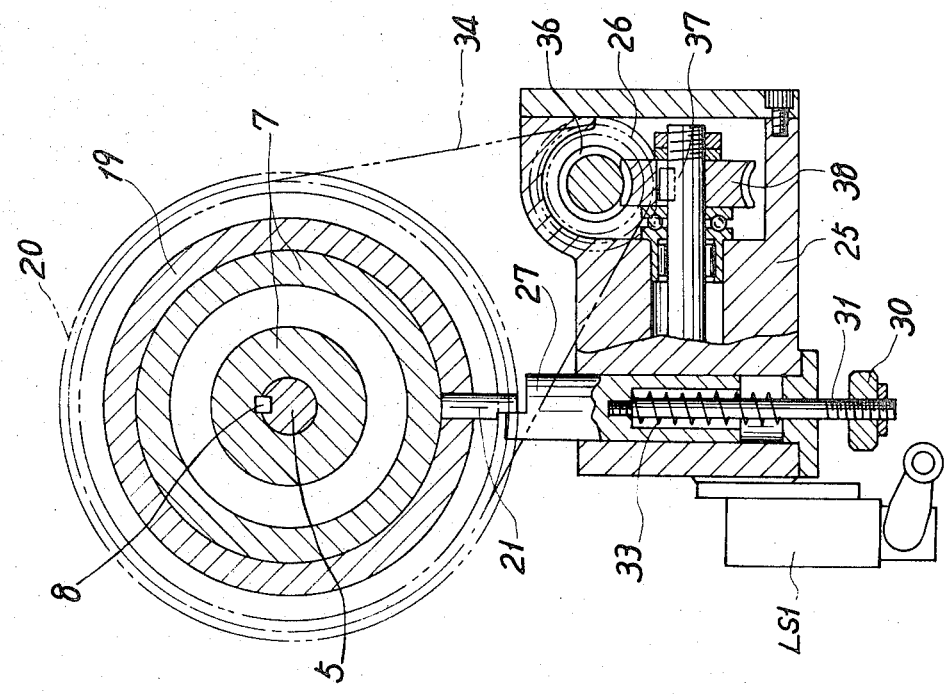

3,782,043

FEED MECHANISM FOR MACHINE TOOL

BACKGROUND OF THE INVENTION

The present invention relates generally to grinding machines and more particularly to a grinding wheel feeding mechanism for use in dead stop machining.

Dead stop machining is an operation in which the degree of rotation of a feed wheel is limited by a stop arrangement, and a workpiece is machined to a desired finished dimension in one stroke by rotating the feed wheel up to the position of the stop. This stop arrangement usually comprises an adjustable stop abutment carried on the feed wheel and a stud fixedly mounted on the front of the machine. When the feed wheel rotates with the stop abutment, the rotary motion of the feed wheel continues until the stop abutment engages the fixed stud.

In a dead stop machining of a workpiece having much stock to be ground out, the feed wheel preferably should be rotated through several revolutions in order to complete grinding the workpiece to the desired finished dimension.

However, in the prior feed mechanisms, it is impossible to rotate the feed wheel through the desired several revolutions for satisfactory dead stop machining, because the rotation of the feed wheel is limited to only one revolution by the engagement of the stop with the fixed stud.

SUMMARY OF THE INVENTION

Accordingly, the general object of the present invention is to provide a feed mechanism for machining a large amount of stock from a workpiece in a dead stop machining process wherein a feed wheel is capable of being rotated through several revolutions.

Another object of the present invention is to provide a stopper mechanism which is movable for restricting the rotary motion of a feed wheel after a predetermined number of revolutions thereof.

Still another object of the present invention is to provide a transmission mechanism for gradually advancing a stopper in synchronization with the rotary movement of a feed wheel to restrict the movement thereof so as to regulate the advanced position of a grinding wheel support.

The foregoing and other objects are attained by the present invention according to one aspect thereof through the provision of an annular member being adjustably mounted on the outer peripheral portion of a feed wheel and an expandable member positioned therein for locking the annular member in a preselected angular position on the feed wheel. A stop abutment is fixed to the periphery of the annular member extending radially therefrom and thus being movable with the locked annular member and feed wheel in a circular path. A stop member for engaging the stop abutment is reciprocatably mounted on the machine bed for movement into and out of the circular path of movement of the stop abutment. Rotary motion of the feed wheel either manually or by an automatic drive is transmitted through a motion reduction drive comprising a sprocket wheel on the annular member, another sprocket wheel on the machine being driven by the first sprocket wheel through a chain thereon, and a worm-worm wheel - rack and pinion arrangement to the stop member for moving the same into the path of the stop abutment for engaging the stop abutment and preventing further revolution of the feed wheel after the feed wheel has been turned through a predetermined number of revolutions, whereby the advancement of a tool may be regulated as desired.

BRIEF DESCRIPTION OF THE DRAWINGS

Various other objects, feature and attendant advantages of the present invention in addition to those mentioned above will be more fully appreciated as the same becomes better understood from the following detailed description when considered in conjunction with the accompanying drawings, wherein like reference numerals designate like or corresponding parts throughout the several views, and in which:

FIG. 3 is a sectional view taken along the line III—III of FIG. 2; and,

FIG. 4 is a sectional view taken along the line IV—IV of FIG. 2.

DETAILED DESCRIPTION OF THE INVENTION

Figure 1:
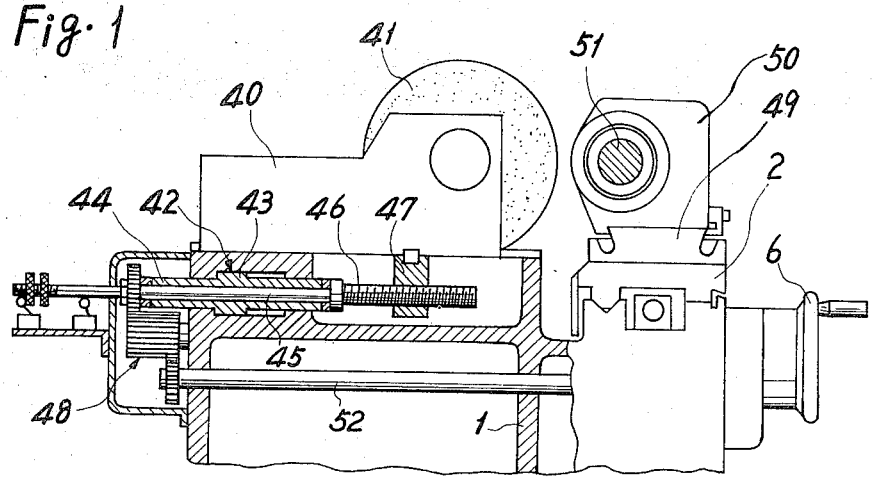
FIG. 1 is a partial sectional view of a grinding machine being provided with a feed mechanism formed according to the present invention.

Referring now to the drawings, and more particularly to FIG. 1 thereof, there is shown a bed 1 on which is slidably mounted a wheel-supporting slide 40 for rotatably supporting a grinding wheel 41. Mounted in the bed 1 is a rapid feed hydraulic cylinder 42 having a piston 43 slidably received therein and a piston rod 44 integrally formed with the piston 43 for rapidly moving the grinding wheel 41 and its supporting slide 40 to and from an operative position. Rotatably mounted in the piston 43 is a coaxially disposed feed shaft 45 having disposed on one end thereof a feed screw 46 which threadably engages a feed nut 47 depending from the lower surface of the wheel-supporting slide 40. The feed shaft 45 is drivingly connected at its intermediate portion to a drive shaft 52 rotatably supported in the bed 1 through a gear train generally indicated by the reference numeral 48.

A work table 2 is slidably mounted on one end of the bed 1 for movement perpendicular to that of the wheel-supporting slide 40 and pivotably supports a swivel table 49 thereon. A head stock 50 and another head stock, not shown, are mounted on the swivel table 49 for supporting a workpiece 51.

Figure 2:
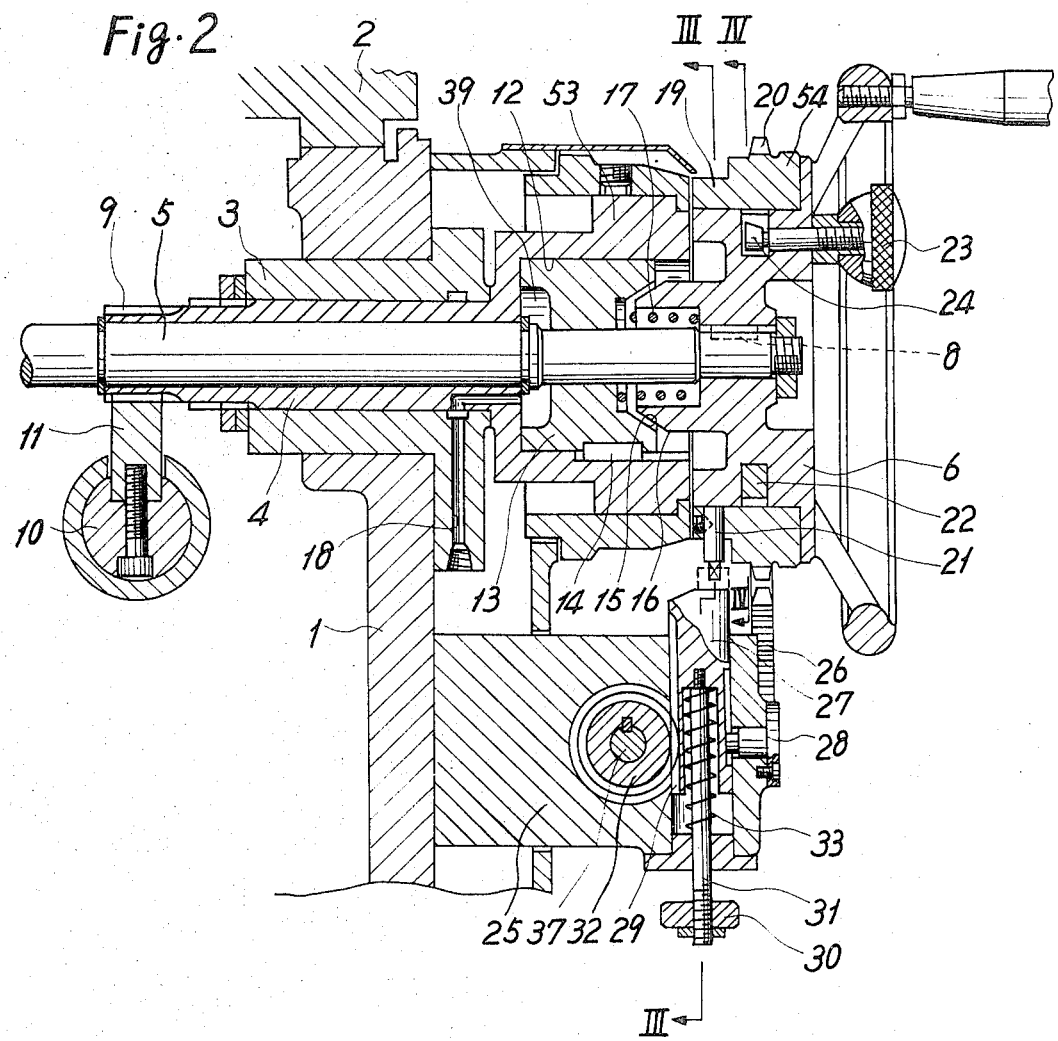
FIG. 2 is a longitudinal sectional view of the feed mechanism according to the present invention.

Referring now to FIG. 2, mounted on the bed 1 is a feed mechanism which is connected with the wheel-supporting slide 40 through a drive shaft 5 connected with the drive shaft 52. The drive shaft 5 is rotatably supported on a cylindrical member 4 which is rotatably received in a bearing member 3 secured on bed 1. The cylindrical member 4 has a cup-shaped portion 53 at one end thereof forming a cylinder 12 therein in which a piston 13 is slidably but non-rotatably received by means of a member 14 keying the piston to the cylinder. The piston 13 is provided with a tapered, or frusto-conical bore 15 in the one end thereof.

Keyed to the one end of the drive shaft 5 as indicated by reference numeral 8 is a feed wheel 6 having on the inside portion thereof a tapered surface 16 cooperatively associated with the tapered bore 15 in the piston 13. A spring 17 is disposed within a bore formed in the tapered portion of the feed wheel 6 for normally urging the piston 13 and the feed wheel 6 to respectively move axially away from each other. A chamber 39 is formed on the left end surface of the piston 13, as viewed in FIG. 2, so that when a pressure fluid is admitted into the chamber 39 through a conduit 18, the piston 13 and the feed wheel 6 are frictionally engaged between the tapered bore 15 and the tapered surface 16 for being rotated as a unit for effecting an automatic feed operation. The cylindrical member 4 also has a pinion 9 formed on its other end opposite the cup-shaped portion 53 which engages a rack 11 secured on a piston rod 10 which is movable to rotate the cylindrical member 4 in a conventional manner, such as by a well-known pressure cylinder arrangement.

In this feed mechanism, a manual feed operation may be performed by turning the feed wheel 6 when the frictional engagement between the tapered bore 15 of the piston 13 and the tapered surface 16 of the feed wheel 6 is released under the separating force of the spring 17. On the other hand, when the feed wheel 6 and the piston 13 are frictionally engaged, an automatic feed operation may be performed since movement of the piston rod 10 is transmitted to the drive shaft 5 through the cylindrical member 4, the piston 13 keyed thereto and the feed wheel 6 which is keyed to the shaft 5.

The feed mechanism is further provided with a stop mechanism, as described hereinafter. Coaxially and rotatably mounted on the outer periphery of the feed wheel 6 is an annular ring 19 having integrally formed thereon a knurled portion 54 and a sprocket wheel 20. The annular ring 19 is further provided with a stop abutment, or projection 21, secured at a predetermined position on the outer peripheral or circumferential portion thereof. Loosely disposed in an annular recess in the periphery of the feed wheel 6 is an expandable ring 22 having a radial slot 35, as shown in FIG. 4, wherein a tapered headed stud 24 is disposed. Accordingly, when the tapered headed stud 24 is advanced toward the left, as viewed in FIG. 2, by rotating a knob 23 on the end thereof through approximately 90°, the expandable ring 22 contracts to permit adjustment of the annular ring 19 relative to the feed wheel 6 to be made to adjust the angular position of the stop abutment 21 on the feed wheel periphery. On the other hand, when the tapered headed stud 24 is retracted toward the right to the position shown in FIG. 4, the expandable ring 22 is expanded to restrict the free rotation of the annular ring 19 on the feed wheel. A plunger or reference stop member 27 is slidably mounted in a vertical direction on a support member 25 secured on the bed 1 and is restrained from rotation with respect thereto by means of a pin member 28 engaging a vertical slot therein. The plunger 27 is provided with a rod 31 having one end disposed in an elongate vertical recess in the lower portion thereof and its other end extending downward and having a threaded dog 30 on the lower end thereof for actuating a limit switch LS1 to control the grinding operation. A spring 33 over the rod 31 urges the plunger 27 upward for eliminating any backlash in the gearing, as will be described hereinafter. The plunger 27 has a rack 29 vertically oriented thereon meshing with a pinion 32. The pinion 32 is rotatably mounted on the support member 25 by a shaft 37 keyed thereto at one end and having a worm wheel 38 keyed at its other end, as shown in FIG. 3. The worm wheel 38 meshes with a worm 36 having a sprocket wheel 26 at one end thereof. A chain 34 connects the sprocket wheel 26 with the other sprocket wheel 20 formed on the annular ring 19 so as to rotate the sprocket wheel 26 according to revolution of the feed wheel 6.

The adjusting operation for dead stop machining with the mechanism of the present invention may be effected as follows. First, before either manual or automatic dead stop machining, no fluid is supplied in the chamber 39 whereby the clutch piston 13 is disengaged from the feed wheel 6. The knob 23 may then be actuated to permit the expandable ring 22 to contract so as to allow the annular ring 19 to be freely rotated on the feed wheel 6. Next, the feed wheel 6 is rotated to advance the wheel-supporting slide 40 so as to perform the desired grinding operation on a workpiece. When the workpiece is ground to a desired finished dimension, the feed wheel 6 is stopped and is held in this position while the annular ring 19 is rotated thereon so that the stop abutment 21 engages the reference stop member 27, whereupon the knob 23 is actuated to expand the expandable ring 22 for locking the annular ring 19 to the feed wheel 6. Next, the feed wheel 6 is reversely rotated to retract the wheel support 40 and thereafter either manual or automatic dead stop grinding may be performed on another workpiece set in the head stocks 50.

However, before automatic dead stop grinding is performed, an additional operation is required by which the frictional engagement between the feed wheel 6 and the clutch piston 13 is effected, namely, supplying pressure fluid to the chamber 39. Both automatic and manual dead stop grinding are performed by rotating the feed wheel 6 to infeed the wheel-supporting slide 40 toward the workpiece. The annular ring 19 is turned integrally with the feed wheel 6 when locked thereto as described. Accordingly, the small sprocket wheel 26 is rotated by the sprocket wheel 20 through the chain 34, the rotation of the small sprocket wheel 26 being reduced through the worm 36 and worm wheel 38, and being transmitted to the shaft 37 to rotate the pinion 32.

The reference stop member 27 is gradually advanced upwardly at this reduced rate of motion by means of the worm 36 and worm wheel 38 to be located only after a predetermined number of revolutions of the feed wheel 6 at its extreme upper position wherein engagement with the stop abutment 21 is permitted for preventing further revolution of the feed wheel 6. The position to which the wheel-supporting slide 40 is advanceable may thus be regulated by the limitation of the number of revolutions of the feed wheel 6, and the slide 40 is automatically stopped at a predetermined position of advancement.

While the invention has been described by means of a specific embodiment, it should be understood that the novel characteristics of the invention may be incorporated in the other structural forms without departing from the spirit and scope of the invention as defined in the following claims.

What is claimed as new and desired to be secured by letters patent of the United States is:

1. A feed mechanism for a machine tool comprising;
    a rotatable feed wheel connected with a tool support for moving a tool support toward and away from a workpiece;
    motion transmitting means adjustably mounted on the outer peripheral portion of said feed wheel;

means for selectively locking said adjustable motion transmitting means to said feed wheel for movement therewith and releasing the same for permitting independent relative rotational motion therebetween;

first stop means secured on said adjustable motion transmitting means and being movable through a circular path with said feed wheel when said motion transmitting means is locked thereto;

second stop means gradually and reciprocatably movable into and out of said circular path in synchronous relation with the rotation of said feed wheel; and transmission means comprising a first wheel connected with said second stop means, a second wheel formed on said adjustable motion transmitting means to be operably moved by the rotation of said first wheel, and connecting means engaging said first and second wheels for causing said said second stop means to be moved into said circular path of said first stop means so that said first stop means may engage said second stop means at a predetermined position of advancement of said tool support after a predetermined number of revolutions of said feed wheel.

2. A feed mechanism as set forth in claim 1, wherein said first wheel of said transmission means is a sprocket wheel connected with said second stop means through a reduction gearing means, said second wheel of said transmission means is a sprocket wheel, and said connecting means is a chain engaging said first and second sprocket wheels.

3. A feed mechanism as set forth in claim 1, wherein said locking means comprises:
   an expandable ring mounted between said feed wheel and said adjustable motion transmitting means having a radial slot therein; and,
   a headed stud in said slot for expanding said ring.

4. A feed mechanism as set forth in claim 1, further comprising means for biasing said second stop means toward said circular path of said first stop means to eliminate back-lash in said gearing means.

5. A feed mechanism as set forth in claim 8, wherein said rotatable feed wheel is connected to said tool support through a drive shaft and is actuated by a hydraulically actuated mechanism comprising:
   a hydraulic actuator;
   a concentric annular member rotatably mounted on said drive shaft being rotatable by said hydraulic actuator; and
   clutch means mounted in said annular member for connecting said annular member with said rotatable feed wheel.

6. A feed mechanism for a machine tool comprising:
   a rotatable feed wheel connected with a tool support for moving the same toward and away from a workpiece,
   an annular member adjustably mounted on the outer periphery portion of said feed wheel,
   means for locking said adjustable annular member with said feed wheel selectively in any angular relation therewith and for releasing the locking engagement therebetween,
   first stop means secured on said adjustable annular member and movable in a circular path with said feed wheel when said feed wheel and said annular member are locked together,
   second stop means slidably mounted on a bed of said machine tool and reciprocatably movable into and out of said circular path of said first stop means in a direction normal to said circular path,
   connecting means connecting said annular member and said second stop means and actuated by said feed wheel upon turning of the same through a predetermined number of revolutions for advancing said second stop means into said circular path for regulating the movement of said tool support toward said workpiece.

* * * * *